April 25, 1961

F. F. McQUEEN ET AL 2,981,412

MACHINE FOR FACILITATING SORTING OR
SIZING OF COMMODITIES, SUCH AS
POULTRY, ACCORDING TO WEIGHT

Filed Sept. 3, 1958

INVENTORS
Franklin F. McQueen
Edward S. Morrissette
BY     Ernest R. Hoke

ATTORNEYS

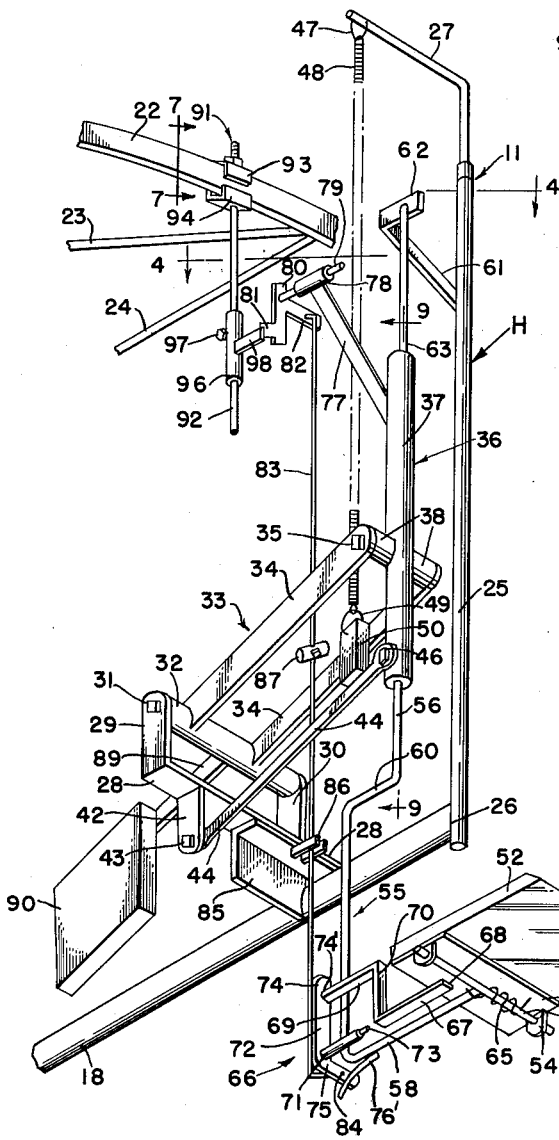
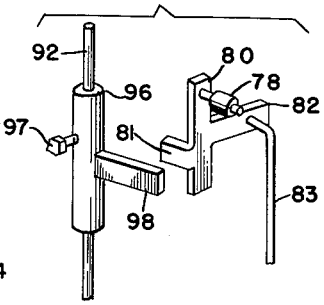
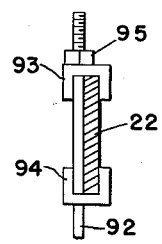
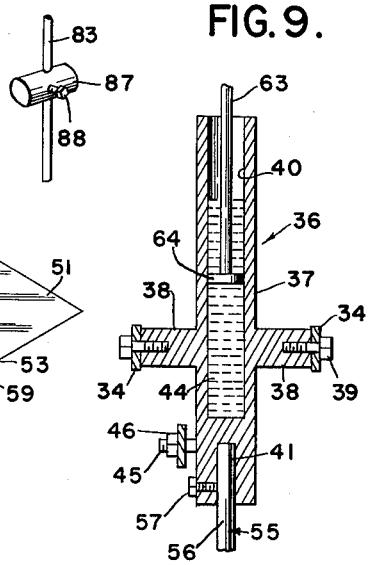
INVENTORS
Franklin F. McQueen
Edward S. Morrissette
Ernest R. Hoke
BY
ATTORNEYS April 25, 1961

F. F. McQUEEN ET AL 2,981,412

MACHINE FOR FACILITATING SORTING OR
SIZING OF COMMODITIES, SUCH AS
POULTRY, ACCORDING TO WEIGHT

Filed Sept. 3, 1958

INVENTORS
Franklin F. McQueen
Edward S. Morrissette
Ernest R. Hoke
BY
Shoemaker & Mattare
ATTORNEYS

United States Patent Office 2,981,412
Patented Apr. 25, 1961

2,981,412

MACHINE FOR FACILITATING SORTING OR SIZING OF COMMODITIES, SUCH AS POULTRY, ACCORDING TO WEIGHT

Franklin F. McQueen, 102 S. Ohio, Tuscola, Ill.; Edward S. Morrissette, Cullom, Ill.; and Ernest R. Hoke, 706 E. Scott St., Tuscola, Ill.

Filed Sept. 3, 1958, Ser. No. 758,797

12 Claims. (Cl. 209—121)

This invention relates broadly to improvements in machines for grading or sizing and sorting commodities according to weight and the invention is directed particularly to improvements in machines or apparatus of this character by which the sizing and sorting according to weight of poultry may be expeditiously carried out.

The sizing by weight of articles of similar character, such as poultry, for example, can, of course, be done by the use of conventional weighing scales. However, obviously this requires that each of the birds or other articles be handled at least twice by the weigher and it also requires that he perform other operations. In this connection the weigher must first pick up the bird, place it on the scale, then note the weight by sight and then remove the bird from the scale and either, after noting the weight indicated by the scale, make some identifying mark on or tag the bird or he must place the bird in a receptacle or in a pile designated for the weight noted. All of these operations or movements required to be performed by the weigher are, of course, time consuming and tiring.

With the foregoing problem in mind, it is a particular object of the present invention to provide a new machine or mechanism whereby the desired results can be accomplished and at the same time the undesirable features attendant upon the weighing of the birds or other articles individually are eliminated and, consequently, the job of sorting or sizing the commodities according to weight may be greatly speeded up with an actual reduction in the work and effort required to be put out by the weigher.

It is another object of the present invention to provide a machine or mechanism for sorting or sizing commodities according to weight which can do, in a prescribed amount of time, the sizing and sorting of a number of birds which would require the services of several weighers following the practice of weighing and sorting the birds on single or individual scales.

A still further object of the invention is to provide a machine of the character stated which is constructed in a novel manner whereby a single attendant has only to place the birds or other commodity upon each of a series of scale pans as they move past him and thereafter the weight of the bird is automatically determined and the bird is discharged from the pan when it reaches a predetermined location in its path of movement and thus the bird will be sized as to weight according to the bin or receiver into which it is discharged from the pan.

Still another object of the invention is to provide, in a manner as hereinafter set forth, a machine for automatically sorting or sizing commodities, such as poultry and the like, according to weight, wherein a plurality of weighing pans are mounted for continuous movement along a predetermined path and wherein a means is provided for effecting the discharge of the commodity from the pan at a desired location according to the extent of movement or depression of the pan under the weight of the bird thereon.

A still further object of the invention is to provide a mechanism of the character stated wherein the weighing pan is spring balanced and wherein the depression of the pan adjusts the elevation of a trip lever which is actuated by a trip arm having a fixed position and against which the lever engages in the advancement of the pan to effect the dumping of the article on the pan at a predetermined or preselected location.

A further object of the invention is to provide, in mechanism of the above described character, trip mechanism which is adjustable as regards the said fixed arm, whereby the tripping of the mechanism and the dumping of the pan can be caused to occur at any desired location along the path of travel of the pan whereby all articles of the same size, according to weight, will be deposited in the same receiver.

Other objects and advantages of the invention will become apparent as the description of the same proceeds and the invention will be best understood from a consideration of the following detailed description taken in connection with the accompanying drawings with the understanding that the invention is not confined to a strict conformity with the showing of the drawings but may be changed or modified so long as such changes or modifications mark no material departure from the salient features of the invention as expressed in the appended claims.

In the drawings:

Fig. 2 is a view in perspective of a single head drawn to an enlarged scale;

Fig. 6 is a detail perspective showing the trip actuator and upper portion of the trip mechanism;

Fig. 7 is a section taken on the line 7—7 of Fig. 2;

Fig. 8 is a perspective of a portion of the trip rod and showing the trip lug thereon; and Fig. 9 is a section taken longitudinally of oscillation control member for the pan and oscillation frame, the section being substantially on the line 9—9 of Fig. 2.

Figure 1:
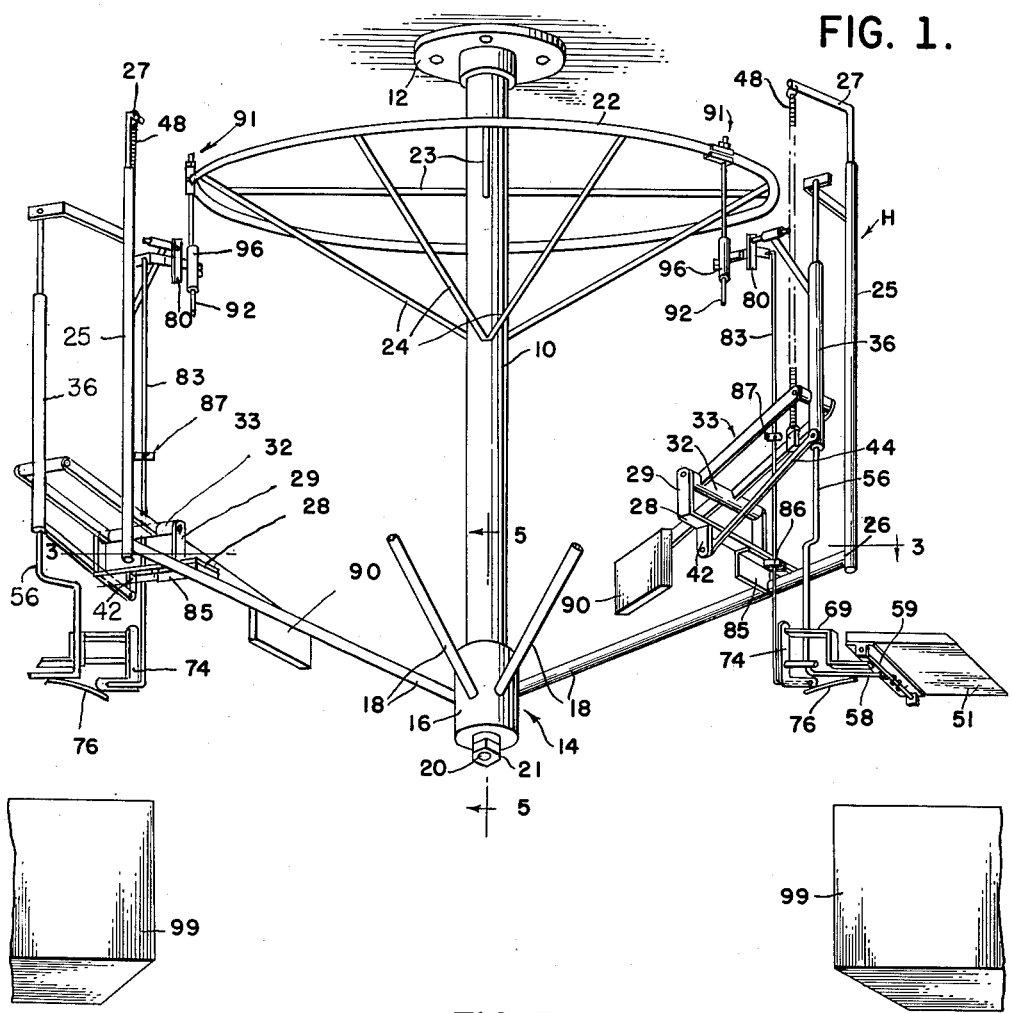
Fig. 1 is a view in perspective of the invention but showing only two of the heads and receptacles for clarity.

The mechanism of the present invention broadly or generally contemplates the provision of a multiplicity of individual weighing structures which will broadly be designated "heads," which are supported so as to move continuously along a fixed path of travel. These heads move relative to fixed trip members or arms which have different adjusted positions so that each arm of the trip member will coact with a trip lever of only one head and as that one head passes such trip arm the said lever will be actuated to discharge the weighed commodity from the weighing pan. Also, the weighing pans of the heads are all spring suspended and when a commodity is placed on the pan, the pan will be depressed and the spring deflected in direct proportion to the weight imposed thereon and this depression of the pan will move the referred to trip lever to a position where it will be engaged and actuated by the one particular trip arm which is preset to effect such tripping operation.

The apparatus is thus designed so that it needs the attention of only one weigher whose duty is merely to place the poultry or other commodity on a weighing pan as the pan moves past the weigher and the pan will then proceed to the point where the trip mechanism will function to effect the deposit of the weighed commodity into the proper receiver for other commodities of the same weight.

Referring now more particularly to the drawings wherein like numerals of reference designate corresponding parts throughout the several views, it will be seen that the machine of the present invention embodies a multiplicity of individual weighing structures, each of which will be generally referred to as a head and each of these heads is generally identified by the reference character H.

The several heads of the machine are supported upon suitable mechanism so that they may be moved simultaneously and continuously along a predetermined path of travel. The supporting means for the heads whereby they can be so moved will now be described.

The head supporting means comprises vertical shaft 10 having at its upper end a suitable mounting means 12 by which the shaft can be suspended from a suitable overhead support.

The lower end of the shaft 10 has mounted thereon for rotation thereabout, a multiple armed or spoked wheel which is generally designated 14 and preferably comprises a central hub portion 16 and a plurality of radial arms or spokes, each of which is designated 18.

Figure 5:
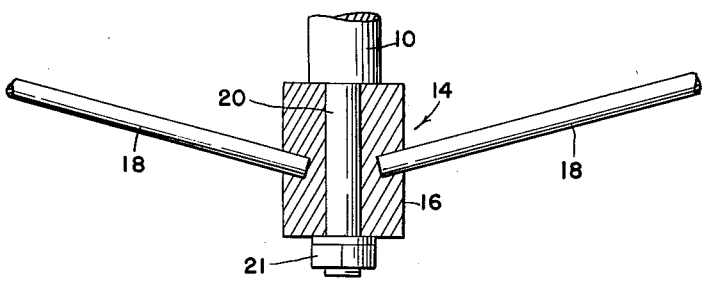
Fig. 5 is a section taken substantially on the line 5—5 of Fig. 1.

As illustrated in Fig. 5, the lower end of the shaft 10 may be of reduced diameter as at 20 to form a short axle for the hub 16 and the hub is here shown as maintained on the lower end of this axle by a nut 21 which is threaded on to the end of the axle.

Encircling the shaft 10 adjacent its upper end and positioned concentrically with the shaft is the annular frame 22, the same being attached to the shaft in a suitable manner as, for example, by means of arms 23 radiating from the shaft and secured at their outer ends to the inner side of the frame. The frame is here shown as being in the form of a band and this annular band frame forms the supporting means for the hereinafter described tripping arms.

In addition to the arms 23, there are provided the upwardly and outwardly inclined struts 24 connected between the annular frame 22 and the shaft 10 to give additional supporting rigidity to the structure.

Each of the wheel arms or spokes 18 supports upon its outer end a head structure H. These head structures are of duplicate or all of exactly the same construction and, therefore, a description of one will suffice for each and every one of the others.

The head structure H comprises as best shown in Fig. 2 a fixed vertical standard 25 rigidly secured at its lower end to the outer end of its respective supporting spoke or arm as indicated at 26.

The upper end of the standard 25 carries the right angularly extending arm 27.

The head supporting spokes 18 are of a length to extend radially outwardly from the shaft a greater distance than the radius of the annular frame 22 and the standard 25 carried upon each spoke rises to approximately the same height as the frame 22 and the arm 27 is spaced outwardly from the frame 22 as illustrated.

Attached to the spoke 18 and supported thereon is a rocker frame supporting platform 28. This platform is disposed transversely of its supporting spoke and extends from the side thereof to lie substantially beneath and inwardly from the arm 27. This platform supports the two upstanding spaced parallel pivot ears 29 and 30 which are connected together at their top ends by and support a pivot rod 31 which is encircled by and rockably supports a hollow rock shaft 32.

The numeral 33 generally designates a vertically swingable rocker frame of which the rock shaft 32 forms a part and this rock shaft has secured thereto an end of each of a pair of arms 34 which extend in spaced parallel relation from the shaft 32 outwardly, terminating at their outer ends approximately in line with the standard 25.

Disposed between the outer ends of the arms 34 is a pan supporting and movement damping member which is generally designated 36. This member, the details of which are best seen in Fig. 9, comprises the elongate body 37 which may be of round or cylindrical form and has integrally formed with it the two aligned oppositely directed and diametrically opposite trunnions 38, each of which has the outer end of an arm 34 positioned against its free end and each arm 34 is pivotally attached to its respective trunnion by a pivot bolt 39 which passes through the arm 34 and into the end of the trunnion as illustrated.

The body 37 has formed therein throughout the major extent of its length, the chamber 40 which opens through the upper end of the body as shown, while the lower end portion of the body below the trunnions 38 has formed therein through and opening at its lower end, the socket 41, for the purpose hereinafter described.

The chamber 40 forms a dash pot chamber as will be hereinafter described.

Attached to the underside of the platform 28 is a depending ear 42 and pivotally attached to this ear by the pivot bolt 43 is one end of a stabilizing rod 44, the opposite end of which is disposed adjacent to the side of the lower end portion of the body 37 and is pivotally coupled thereto in a suitable manner as, for example, by means of a stud 45 carried by the body 37 and upon which a securing nut 46 is threaded to maintain the outer end of the rod 44 in position thereon.

Attached to the suspension arm 27 as by a ring 47 or the like is one end of a coil spring 48. This spring extends straight down from the arm 27 to the stabilizing arm 44 to which it is attached by an eye 49 joined to a lug 50 which, in turn, is secured to the stabilizing arm 44 as illustrated.

As will be readily apparent the spring 48 normally maintains the rocker frame and the pan support and movement damping member in a raised or elevated position. The spring likewise supports the pan upon which the commodity is placed to be weighed, in a manner hereinafter described.

The numeral 51 designates the weighing pan forming a part of the head structure H, and is supported from the support member 36 and in turn by the spring 48, in a manner about to be described.

The pan 51 is here shown as being in the form of a flat plate of approximately square or rectangular outline and having side and back flanges 52 and disposed across the bottom of the pan body is a hinge plate 53 having at the opposite ends the depending or downturned hinge ears 54.

The numeral 55 designates a pan carrying rod which has an upper end 56 which is inserted in the socket 41 and secured in a suitable manner as by means of the set screw 57. The lower end portion of the pan rod 55 is defined by the right angularly extending and outwardly directed arm 58 and the outer end of this arm is attached to the central portion of the hinge bar 59 which parallels the underside of the hinge plate 53 and extends through the hinge ears 54 so that the pan 51 is oscillatable upon this bar 59 as will be obvious. The pan 51 is thus supported below and may be disposed outwardly with respect to the standard 25 so that the placement of a body upon the pan for weighing will not be interfered with by any part of the mechanism.

While the pan rod 55 may be entirely straight in the vertical part thereof where it extends downwardly from the support member 36 to the outwardly extending lower end portion 58 thereof, it is here illustrated as having the rearwardly extending or offset portion 60 so that the major part of the vertical lower portion of the rod will be set back or set in toward the shaft 10 for the convenient placement of certain of the other parts of the mechanism as will be apparent from the description hereinafter given.

It will be obvious from the description of the mechanism as thus far given that the weighing pan is supported by and suspended from the spring 48. If freely supported or unrestrained in its up and down movements, it will be seen that, as an article is placed upon the pan, the spring may first be stretched beyond the limits necessary to support the article and it will then rebound and possibly several movements will be made before the pan comes to rest and this action will be repeated when the article is discharged from the pan. Accordingly there is provided a damping means for regulating or slowing the movements of the pan and to this end there is provided the arm 61 which is attached to the upper end of the standard 25 and has the radially outwardly directed free end portion 62 to which is attached the upper end of a piston rod 63. The lower end of this piston rod carries a piston in the form of a disc or washer 64 which lies within the receptacle 40 of the movement damping member 36. This receptacle is substantially filled with a suitable liquid such as oil or the like, and the diameter of the disc 64 is only slightly less than the inside diameter of the receptacle 40 so that the up and down movement of the disc 64 in the receptacle will be substantially retarded. The parts thus described, of course, form what is conventionally known as a dash pot damping means which controls the up and down movements of the weighing pan 51 in an obvious manner.

Means is provided for maintaining the pan 51 in a horizontal position above the angled end 58 of the rod 55 and such means is here shown as comprising a coil spring 65 encircling or twisted about the hinge bar 59 and having one end bearing against the underside of the hinge plate 53 while the other end is secured to the angled end 58 of the pan supporting rod.

As will be apparent, the spring 65 is so formed and connected with the pan that when the pan is caused to turn on the hinge rod to an inclined position for the purpose of discharging an article thereon, the spring 65 will be twisted or tightened and in reacting will return the pan to its horizontal position.

The pivot axis for the pan 51 is, as shown, a substantial distance rearwardly of the transverse center of the pan so that the major portion of the pan extends forwardly beyond the pivot and, therefore, when the pan is released, in the manner hereinafter described, the article on the pan will cause the latter to tip.

Each head H includes in its structure a pan tripping or releasing mechanism which coacts with a preset actuator carried by the frame 22 whereby all articles of the same weight placed successively upon a specific pan will be dumped or discharged at the same location into a suitable receptacle.

Tripping mechanism for the head structure is generally designated 66 and is connected between a latching arm attached to the pan 51 at the back thereof, and an actuating bell crank which is supported at a substantial distance above the pan and in the proximity of the frame 22.

The pan latching arm is designated 67 and, as shown, comprises an elongate member having one end secured as at 68 to the rear part of the pan or to the hinge plate as here shown, while a free opposite end portion 69 projects rearwardly from the pan and is elevated above the end which is attached to the pan, by the intermediate connecting portion 70 which is at substantially right angles to the forward and rear end portions of the latch arm.

The rear end portion 69 of the pan latch arm lies upon one side of and extends across the lower end portion of the rod 55 and this lower end portion of the rod 55 at an elevation below the end portion 69 of the latch arm, has secured transversely thereof the horizontal bearing sleeve 71.

At the rear end of the bearing sleeve 71, a bell crank 72 is oscillatably mounted on the bearing sleeve by means of the pivot finger 73 which projects laterally from the side of the bell crank at the angle thereof between the legs 74 and 75 of the bell crank and extends through the bearing sleeve 71 in the manner shown. The leg 74 normally assumes an upright position and has a notch 74' in one edge which forms a hook in which the free end 69 of the latch arm 67 engages and by this means the weighing pan is maintained normally in horizontal position while it is weighing or supporting an article thereon.

The other leg of the bell crank 72, designated 75, normally assumes a horizontal position as shown, and is held against oscillation downwardly from this position by a support finger 76' attached to the angled end portion 58 of the pan supporting rod 55.

The upper end of the pan supporting and movement damping member 36 has secured thereto the lower end of an upwardly and forwardly directed arm 77 across the upper end of which arm is secured the short bearing sleeve 78, the axis of which is directed radially of the structure (see Fig. 6).

A pivot pin extending through the bearing sleeve 78 and designated 79 carries upon its inner end a trip member 80.

On the inner side of the trip member 80 is a striker 81, the function of which will hereinafter appear.

Adjacent to the upper pivoted end of the trip member 80 is a short right angularly extending and rearwardly directed arm 82 and pivotally attached to this arm 82 is the upper end of a depending rod 83. This rod, as shown, passes downwardly between the arms 34 and at its lower end is pivotally attached as at 84 to the outer end of the leg 75.

The platform 28 which is secured at one end to a spoke 18 is rigidly reinforced by a bracing bracket 85 which is also attached to the spoke 18 and extends laterally therefrom upon the underside of the platform. The rod 83 passes across the outer edge of the platform 28 and of the reinforcing bracket 85 and also passes between a pair of spaced check members 86.

At a substantial distance above the check members 86 the rod 83 has fixed thereto a trip lug 87. As shown, this trip lug is adjustable on the wire so that it can be moved up or down for adjustment as may be desired. This trip lug may be of any suitable form and fixed to the rod in any suitable manner for the adjustment but, as shown in Fig. 8, the lug may be in the shape of a short bar or cylinder through which the rod 83 passes transversely, with a set screw 88 threaded into the lug for binding engagement against the rod to hold the latter and fix the lug thereon as will be apparent.

The lug 87 is of a size and formation whereby upon downward movement of the rod 83 it cannot pass between the check members or yoke which these members form but will strike the top of the members and effect the tripping of the pan so that the latter may discharge whatever article may be thereon.

Secured to the rock shaft 32 is a rearwardly or inwardly extending arm 89 upon the inner end of which is mounted a counter-balance weight 90. This weight 90 counter balances the structure 36 and the parts attached thereto so that when there is nothing upon the scale pan 51, there will be no strain or pull upon the spring 48 and the latter can return freely to its fully contracted condition.

As hereinbefore stated, each of the several spokes 18 of the rotary member or wheel 14 supports upon its outer end a head H and as the wheel is rotated it will be apparent that the heads move around the shaft 10 and around the frame 22 which is fixed to the upper end of the shaft. The mechanism described preferably is located upon the advancing side of each spoke and of the standard 25 and the upwardly and forwardly extending arm 77 supports the trip member 80 relatively close to the frame 22 with the striker upon the inner side thereof by which is meant, upon the side nearest the shaft 10.

Fixed to and in circumferentially spaced relation around the annular frame 22 are a number of trip member actuators, each of which is generally designated 91. There is one of these actuators for each head H and each actuator is adjusted to function in connection with the heads carrying a fowl or other body, for different weights of bodies, or one only may function in connection with each head if the head pans should all be carrying fowls or other bodies of the same weight.

Each of the actuators 91 comprises a rod 92 which has an end passing upwardly between two clamp members 93 and 94 which grip between them the annular frame member as shown. The lower clamp member 94 may be fixed to the rod 92 with the latter passing therethrough, while the upper clamp member 93 may be suitably apertured to have the rod 92 pass freely therethrough with the upper end of the rod screw threaded to receive a clamping nut 95 whereby the clamps can be drawn together to fix the rod in hanging position as shown in Fig. 7.

Each rod 92, which hangs from the annular frame as shown, has adjustably fixed thereon the sleeve 96. Adjustment of the sleeve on the rod may be effected in any desired manner as by means of a set screw 97.

The sleeve 96 has fixed thereto one end of a radially outwardly extending trip finger 98 and this trip finger is of proper length to extend into, or terminate in, the path of movement of a striker 81 of the head with which the actuator is set to function.

Figure 3:
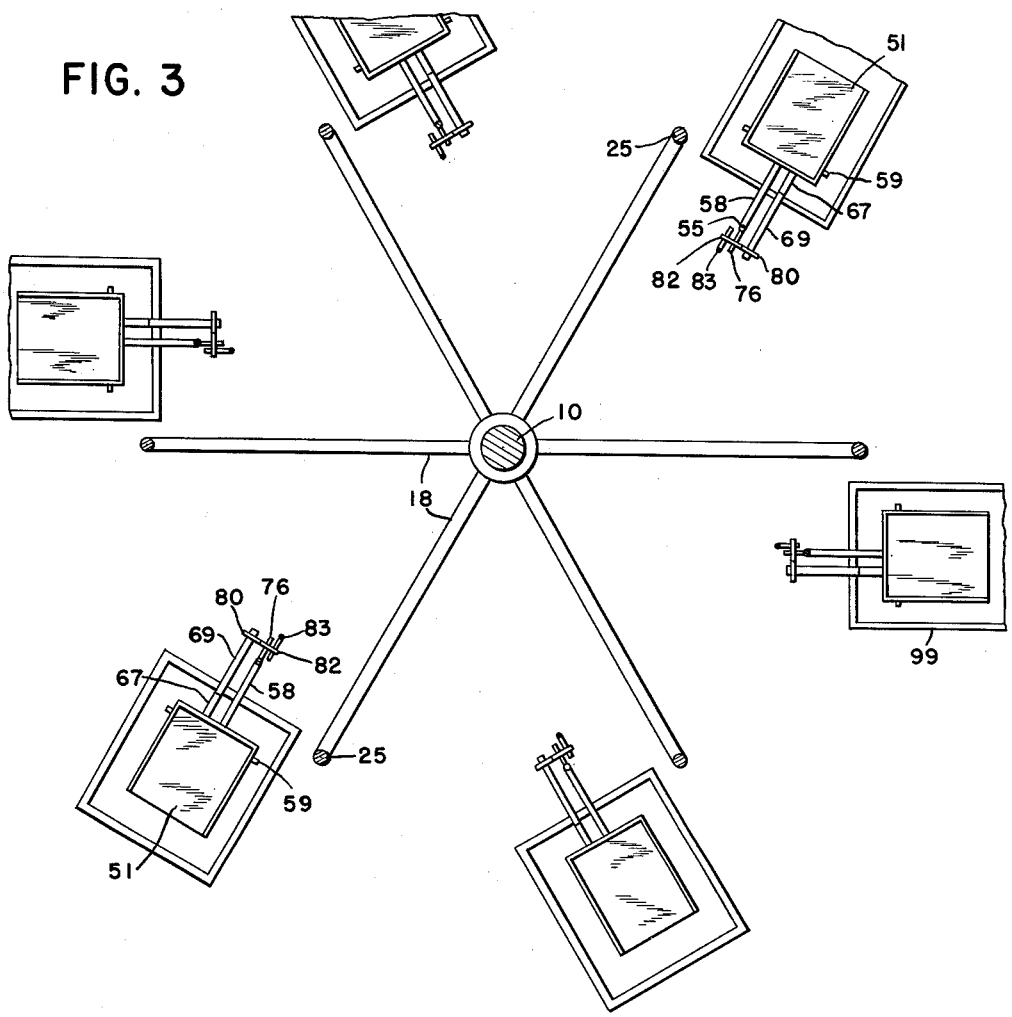
Fig. 3 is a section taken in a horizontal plane substantially on the line 3—3 of Fig. 1.
Figure 4:
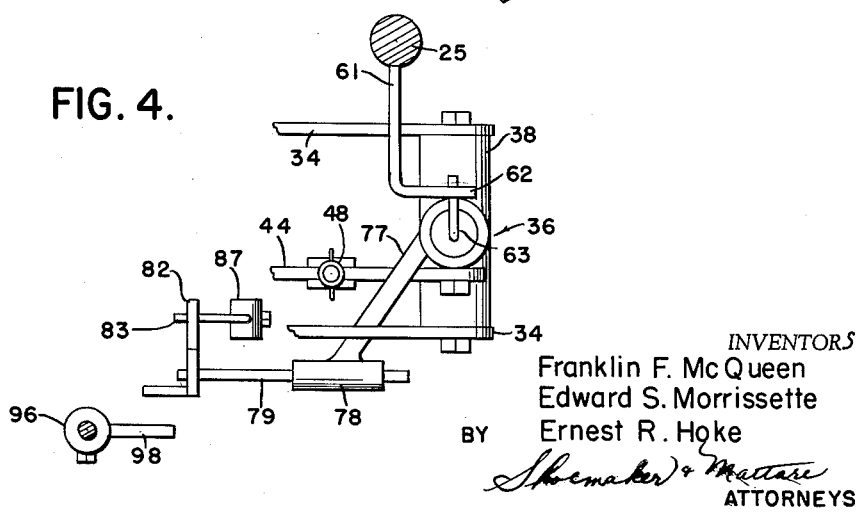
Fig. 4 is a section taken in a horizontal plane substantially on the line 4—4 of Fig. 2.

In association with the mechanism described, there are employed a suitable number of bins or other receiving means, each of which is diagrammatically illustrated and shown in Figs. 1 and 3 generally designated 99. Each of these bins or receptacles is so disposed beneath the horizontal path of travel of the pans 51 of the heads H that when each head moves past its respective actuator 91 to have the striker 81 come in contact with the trip finger 98, the article upon the pan will be discharged into the bin.

In the operation of the present mechanism, associated with the necessary circular or annular arrangement of article receiving bins around the axis of the shaft and below the pans 51 as stated, as the wheel is rotated or as the heads move in their fixed paths of travel an attendant positioned in the proper location will place a bird or other body to be weighed upon the pan. The weight or mass of the body on the pan will then, of course, depress the pan and swing the rocker frame 33 downwardly against the tension of the spring 48, the deflection or stretching of the suspension spring being, of course, proportional to the force or weight applied to it. This downward movement of the pan and parts associated with it will be checked or slowed somewhat by the dash pot arrangement comprised in the piston member 68 located in the oil body in the chamber 40 of the member 36. Also, as the member 36 moves downwardly, the striker 81 will be lowered to an elevation where, in the rotation of the heads, it will engage the trip finger 98 of the actuator which is set to effect the discharge from the pan 51 of birds or other articles of the same weight.

Upon the striker 81 contacting the actuator trip finger 98, the trip member 80 will be forced to turn in a direction to pull upwardly on the rod 83. This will pull upwardly on the leg 75 of the trip mechanism 66 so as to disengage the hooked end 74' of the latch leg 74 from the rear end of the latch arm 67. This will release the pan 51 so that the weight of the bird, or other body thereon, will cause the pan to tip and the body will be discharged and this action, of course, occurs when the pan 51 is disposed over that particular receiving bin designed to receive birds or other bodies of the particular weight which will deflect the spring 88 to the necessary extent to lower the striker 81 into the described elevation where it will engage the trip finger 98.

If it should be desired to have heavy pieces over a predetermined weight trip the mechanism and be discharged immediately from the pan after they have been placed thereon, such heavy pieces will cause the pan to be deflected to a sufficient extent to bring the trip lug 87 down into engagement with the yoke forming check members 86. This will, of course, stop the downward movement of the rod 83 and actuate the trip mechanism 66 to immediately discharge the body from the pan.

It will be readily apparent that there may be employed a spoked wheel of any radius having any number of spokes each carrying a head structure. Therefore, the invention is not to be restricted to the employment of a structure having the particular number of spokes shown.

In addition ot the foregoing, while the circular arrangement illustrated and described is preferred, it will be seen that the heads may be set up so as to be moved in a continuous or endless path which may not be circular but may be elliptical, or otherwise elongated.

We claim:

1. Apparatus for sizing bodies according to weight comprising, in combination, a plurality of arms mounted for movement in a fixed horizontal path, a plurality of spaced trip members supported in a line paralleling said path and each having an adjusted working position, a weighing mechanism carried by each arm for movement thereby in said fixed path, each mechanism including an elongate member, a resilient weight determining means suspending such elongate member for longitudinal reciprocation in an up-and-down path, means forming an operative coupling between the elongate member and the carrying arm therefor for holding said elongate member to said longitudinal reciprocation in said up-and-down path, means carried upon the lower end of said elongate member for receiving a body to be weighed, and means forming a part of and movable with the mechanism for engagement with and actuation by an adjusted trip member whereby to effect removal of a body from said body receiving means.

2. The invention according to claim 1, wherein said trip members are of a character to be preset to function according to a selected weight of a body to be discharged from the said receiving means.

3. The invention according to claim 1 with means movable with the elongate member and coacting with a means stationary with respect to the adjacent arm for immediately effecting the discharge from the body receiving means of a body placed thereon when the weight of such body is in excess of a preselected amount.

4. The invention according to claim 1, wherein the mounting of the arms for movement in said fixed horizontal path comprises a shaft supported for rotation about a vertical axis with said arms radiating therefrom and each has the weighing mechanism thereon at the outer end thereof to be moved around said vertical axis.

5. Apparatus for sizing bodies according to weight comprising, in combination, a plurality of support members, means carrying said members for movement in a prescribed path, a plurality of weighing mechanisms each supported on a member, a stationary frame above said members, each of said weighing mechanisms embodying; a standard rising from a support member, an elongate frame rockably supported on the support member, a weighing pan operatively coupled with said elongate frame for up-and-down movement with rocking of the frame, a coil spring suspended from the standard and having a lower end operatively connected with the pan for resiliently suspending the latter, said operative coupling of the pan with the frame including a pivotal support for the pan with means for releasably maintaining the pan substantially horizontal, and means operatively connected with and between the mechanism and the stationary frame for coaction one with the other for effecting release of the pivoted pan upon a prescribed extent of movement of the mechanism carrying members and the mechanisms thereon in said path.

6. The invention according to claim 5, with means for damping the movements of the pan.

7. Apparatus for sizing bodies according to weight comprising, in combination, a vertical shaft, a wheel supported thereon for rotation in a horizontal plane and including radial spokes, an annular frame concentric with and supported by the shaft in a plane above the wheel, a plurality of individual weighing mechanisms, each of said mechanisms being supported on a spoke and embodying; a standard on and rising from the spoke, an elongate rocker frame extending substantially radially of the wheel and supported adjacent to one end of the spoke to turn on a substantially horizontal axis, a weighing pan, means connecting the pan with and below the outwardly extending other end of said elongate rocker frame to rise and fall with the rocking of the frame, stabilizing means connected between the said means connecting the pan with the elongate frame and a part of the apparatus which is stationary relative to the rocker frame to insure straight up-and-down movement of the pan, apparatus operatively connected with the pan and which when made operative effects removal of a body from the pan, and means carried by said annular frame adapted to operate the last said apparatus at a selected position in the movement of the weighing mechanism relative thereto.

8. The invention according to claim 7, wherein said pan is pivoted for oscillation in a direction to discharge a body therefrom, the last said apparatus including a movable latch means holding the pan against oscillation, a pivoted trip member, and a rod coupling the trip member and latch means, the said means carried by the annular frame acting upon the trip member to pivot the latter and effect the movement of the latch means to release the pan for oscillation.

9. The invention according to claim 7, wherein the said means connecting the pan with the said other end of said rocker frame comprises an elongate member in vertically disposed position, a pivot coupling between the elongate member and the said other end of the rocker frame, said part of the first mentioned apparatus having the stabilizing means connected thereto comprising a rigid platform on which the rocker frame is mounted, said stabilizer means being an arm pivoted at one end to the platform and pivoted at its other end to the lower end of said elongate member below the rocker frame, and movement damping means for said pan comprising an upwardly opening receptacle in the upper end portion of said elongate member, a liquid in the receptacle and a dasher piston suspended from the standard and submerged in the liquid in the receptacle.

10. The invention according to claim 8, with another means for actuating the latch member to release the pan upon a depression of the pan under a predetermined excessive load, comprising a trip lug secured to said rod and a fixed check member for engagement by the lug on downward movement of the rod under said excessive load on the pan.

11. The invention according to claim 8, wherein the said means carried by the annular frame comprises a short rod secured to and depending from the annular frame, and a trip finger attached to said short rod for adjustment longitudinally thereon and extending radially outwardly into the path of movement of the trip member.

12. The invention according to claim 8, with spring means connected with the pan and biased to reversely oscillate the pan after a body has been discharged therefrom.

References Cited in the file of this patent
UNITED STATES PATENTS

| | | |
|---|---|---|
| Re. 15,218 | Price | Nov. 1, 1921 |
| 1,199,184 | Hubmann | Sept. 26, 1916 |
| 1,355,999 | Nelson | Oct. 19, 1920 |
| 1,956,762 | Gangler | May 1, 1934 |
| 2,092,109 | Dodge | Sept. 7, 1937 |
| 2,138,475 | Hilton | Nov. 29, 1938 |
| 2,678,185 | Howard | May 11, 1954 |
| 2,759,603 | Bradley | Aug. 21, 1956 |